US012811160B2

(12) United States Patent
Zhu et al.

(10) Patent No.: US 12,811,160 B2
(45) Date of Patent: Nov. 24, 2026

(54) LASER INDUCED Pt CATALYST MATERIALS

(71) Applicant: Hong Kong Quantum AI Lab Limited, Hong Kong (CN)

(72) Inventors: Haoyu Zhu, Hong Kong (CN); Andrea Grippi, Hong Kong (CN)

(73) Assignee: Hong Kong Quantum AI Lab Limited, Hong Kong (CN)

( * ) Notice: Subject to any disclaimer, the term of this patent is extended or adjusted under 35 U.S.C. 154(b) by 501 days.

(21) Appl. No.: 18/483,694

(22) Filed: Oct. 10, 2023

(65) Prior Publication Data

US 2024/0120500 A1 Apr. 11, 2024

Related U.S. Application Data

(60) Provisional application No. 63/414,658, filed on Oct. 10, 2022.

(51) Int. Cl.
*H01M 4/00* (2006.01)
*H01M 4/88* (2006.01)

(52) U.S. Cl.
CPC ....... *H01M 4/8878* (2013.01); *H01M 4/8842* (2013.01)

(58) Field of Classification Search
CPC .......................... H01M 4/8878; H01M 4/8842
USPC .............................................................. 502/5
See application file for complete search history.

(56) References Cited

U.S. PATENT DOCUMENTS 6,419,998 B1 7/2002 McGrath
9,768,355 B2 * 9/2017 El-Shall ............. H10H 20/8262
2008/0206616 A1 * 8/2008 Atanassova ......... H01M 4/8882 429/479
2020/0112026 A1 4/2020 Tour et al.

FOREIGN PATENT DOCUMENTS

CN 114570386 A * 6/2022 ........... C25B 11/061

OTHER PUBLICATIONS

Peng et al., "Laser solid-phase synthesis of single-atom catalysts" Light: Science & Applications (2021); 10:168; 14 pages.
Muqing Ren, et al, "Laser-Induced Graphene Hybrid Catalysts for Rechargeable Zn-Air Batteries," ACS Appl. Energy Mater. 2019, 2, pp. 460-1468.

* cited by examiner

*Primary Examiner* — James E Mcdonough
(74) *Attorney, Agent, or Firm* — Leason Ellis LLP

(57) ABSTRACT

A method of forming a platinum on carbon (Pt/C) catalyst, comprising the steps of: impregnating a carbon substrate made of carbon materials with an aqueous Pt ion containing solution; drying the impregnated substrate; and scribing the surface of the substrate in-situ with a laser beam by moving the beam over the surface in order to vaporize the carbon materials and redeposited them as nano sized carbon particles onto the carbon substrate. As a result, the heat generated in situ from the laser process reduces Pt salt particles dispersed on the surface into Pt (0). This avoids the slurry preparation, tape casting and drying procedure of the prior art and results in reduced manufacturing times and a better product.

15 Claims, 3 Drawing Sheets
(3 of 3 Drawing Sheet(s) Filed in Color)

LASER INDUCED Pt CATALYST MATERIALS

CROSS-REFERENCE TO RELATED PATENT APPLICATION

This application claims the benefit of priority under 35 U.S.C. Section 119(e) of U.S. Application No. 63/414,658, filed Oct. 10, 2022, which is incorporated herein by reference in its entirety.

FIELD OF THE INVENTION

The present invention relates to the creation of a platinum (Pt) catalyst and, more particularly, to the creation of a Pt catalyst for a membrane electrode assembly (MEA) in a fuel cell.

BACKGROUND OF THE INVENTION

Platinum on carbon, often referred to as Pt/C, is a form of platinum used as a catalyst. The Pt metal is supported on activated carbon in order to maximize its surface area and activity. Pt/C is generally used as the catalyst for proton exchange membrane fuel cells (PEMFCs). Traditional production of such a catalyst requires a long process including impregnation of the activated carbon powder with a Pt ion containing solution and the following chemical or thermal reduction of the Pt ions to Pt (0) particles. Such Pt (0) particles are deposited on the activated carbon particles. The size of the Pt particles and their dispersion have significant impact on their catalytic performance. However, due to the high surface energy of Pt nanoparticles, they tend to agglomerate and grow into larger particles that later result in an uneven distribution on the activated carbon particles.

The processing of the catalyst onto the fuel cell electrode requires quite a few more steps after the powdery catalyst is synthesized. It needs to be made into a slurry, which is then applied onto a gas diffusion layer (GDL) or the proton exchange membrane (PEM) and then dried. These steps are time consuming and usually involve use of a high power sonicator, laminator and high temperature oven.

In particular, the current state-of-the-art procedure for manufacturing Platinum based catalysts is a lengthy process, especially for automotive applications. Such a process typically involves at least 15 steps to transform carbon black to the catalyst dry powder, including multiple filter-wash-dry cycles which can be time consuming, and ovens operating at 105° C.-950° C., which can consume a large amount of energy. Finally, the traditional fabrication process does not allow for good control of Pt particle size and dispersion on the carbon supports.

However, in the paper Peng et al., "Laser solid-phase synthesis of single-atom catalysts" *Light: Science & Applications* (2021) 10:168 there is described a laser-based method to introduce $Pt^{2+}$ into an electrochemical graphite oxide (EGO) structure to synthesize a Pt single atom catalyst (SAC). Simply by rapid laser scanning/irradiation of a freeze-dried electrochemical graphene oxide (EGO) film loaded with chloroplatinic acid ($H_2PtCl_6$), simultaneous pyrolysis of $H_2PtCl_6$ into SACs is enabled and there is a reduction/graphitization of EGO into graphene. The product is intended for a hydrogen oxidation reaction and is in the powder form.

SUMMARY OF THE INVENTION

The present invention is directed to the improved production of Pt/C through the use of an in-situ laser induction technique. The method of the invention for generating Pt based catalysts, which could be in the form of particles supported on certain substrates, adopts a laser induction procedure for use on a carbon substrate that had been previously sprinkled with a liquid Pt ion containing solution. Such a substrate, typically in the form of carbon paper, can be used as a gas diffusion layer, i.e., as the electrode in a fuel cell. This laser procedure allows for the creation of laser-induced Pt based catalysts without the use of pyrolytic ovens or reductive chemicals, and it allows for precise control of the size and dispersion of the Pt particles deposited on the carbon based substrate. In effect it allows for the direct deposition of Pt catalyst on the electrode without adoption of the whole slurry preparation, tape casting and drying procedure.

The laser induction process follows a similar mechanism to thermal reduction. Such a process reduces the $Pt^{4+}$ to $Pt^{2+}$ at 300-320° C. and $Pt^{2+}$ to Pt (0) at 375-510° C. The laser focal point has a diameter of 0.01 mm and can be smaller, which allows the reduction of the Pt ions and a relatively precise control of the Pt (0) deposition location on the carbon substrate.

Thus the invention comprises: a method that induces the growth of Pt metallic particles of controllable size and with a controllable density on carbon paper by an "in situ" laser scribing approach.

The current invention is limited by the power of the laser that is used. In particular, the laser power is directly related to the temperature or the energy at the laser/substrate contact point and determines the oxidation state of the Pt. The laser power also determines whether the laser process undergoes laser ablation, laser melting or laser fragmentation mechanisms. Thus, it determines the Pt (0) particles size.

The method of the invention reduces the manufacturing times to in-situ induce the Pt nano-particles directly onto the carbon sheet. Thus, it brings a higher degree of control over the size of the Pt nano-particles, resulting in better Oxygen Reduction Reaction (ORR) performances. It is a technology that allows for a higher degree of integration in manufacturing processes and can consistently bring down the cost of Fuel Cell membrane electrode assemblies.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The foregoing and other objects and advantages of the present invention will become more apparent when considered in connection with the following detailed description and appended drawings in which like designations denote like elements in the various views, and wherein.

DETAILED DESCRIPTION OF THE INVENTION

Pt has been known as a good catalyst candidate for many reactions that involve gaseous chemicals, such as an oxygen reduction reaction and a hydrogen oxidation reaction, due to its excellent reactivity and adequate bonding energy to gaseous chemicals.

Figure 1A:
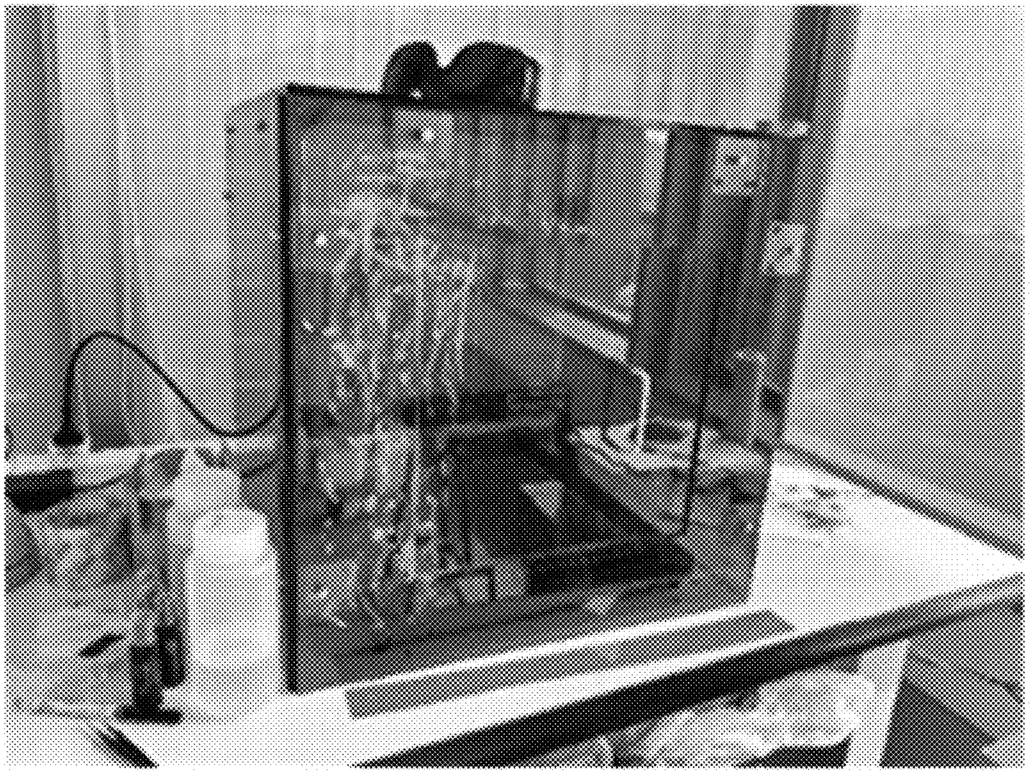
FIG. 1A is a photograph of a main body of a laser placed in a laser protection box in which the Pt catalyst is created and FIG. 1B is a diagram of a laser scribing procedure on a carbon substrate according to the present invention.
Figure 1B:
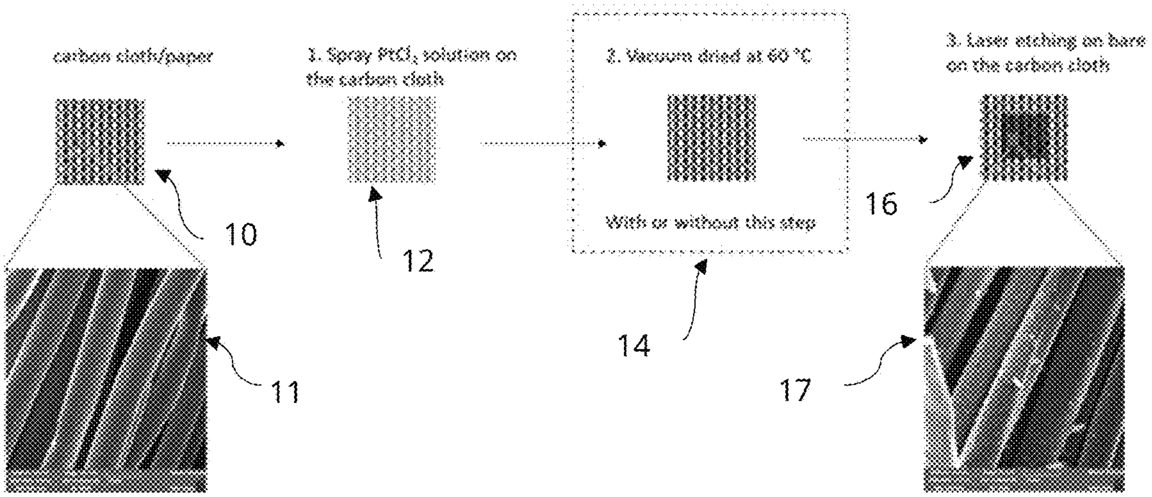

A carbon substrate used in the present invention can be carbon paper as shown in illustration 10 and photograph 11 of FIG. 1B. In some embodiments, aqueous Pt ion containing solution (0.1 mM to 100 mM of $PtCl_4$, $H_2PtCl_6$, $H_2Pt(OH)_6$) is used to impregnate carbon substrates through spraying or soaking as shown in illustration 12.

After being dried in a vacuum oven or under $N_2$, Ar or other inert gas atmospheres (or not being dried) as shown in illustration 14 of FIG. 1B, the carbon paper is placed properly under the laser beam device as shown in FIG. 1A. The laser beam device, which may project a 455 nm blue light, is operated to scribe on the carbon cloth as shown in illustration 16 and photograph 17 of FIG. 1B. This process vaporizes the carbon materials and redeposits them as nano sized carbon particles onto the carbon substrate, as in the survey X-ray photoelectron spectroscopy (XPS) scan in FIGS. 2A-2C. Simultaneously, the heat generated in situ from the laser process reduces Pt salt particles dispersed on the surface into Pt (0). In effect, the laser scribing process reduces the $Pt^{4+}$ to $Pt^{2+}$ at 300-320° C. and $Pt^{2+}$ to Pt (0) at 375-510° C. This has been confirmed with XPS scans. The laser beam power, sweeping frequency and pulsation can be adjusted to obtain different Pt oxidation states and particle morphology.

Figure 2A:
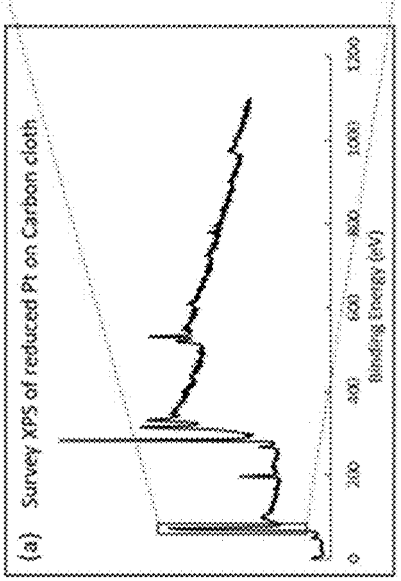
FIG. 2A is a graph of a survey X-ray photoelectron spectroscopy (XPS) scan of reduced Pt on a carbon cloth.
Figure 2B:
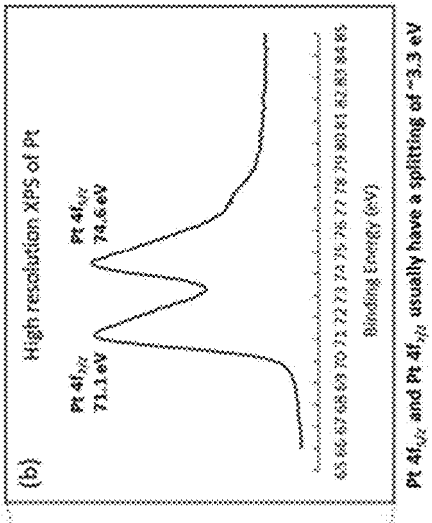
FIG. 2B is a high-resolution X-ray XPS of Pt $4f_{7/2}$ and $4f_{5/2}$ peaks and FIG. 2C shows the Pt binding energies of Pt metal, Pt(II) and Pt(IV)
Figure 2C:
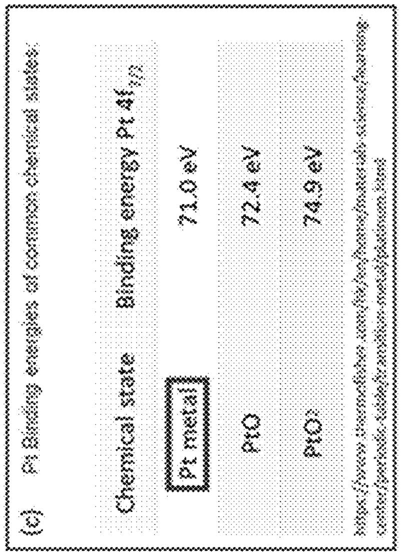

FIG. 2A shows the survey XPS scan of reduced Pt on the carbon cloth. FIG. 2B is an expanded graph of the Pt $4f_{5/2}$ and Pt $4f_{7/2}$ peaks from FIG. 2A showing that the peaks usually have a separation of 3.3 eV. The table of FIG. 2C shows the chemical state and binding energy Pt $4f_{7/2}$ of Pt metal, PtO and $PtO_2$.

Figure 3A:
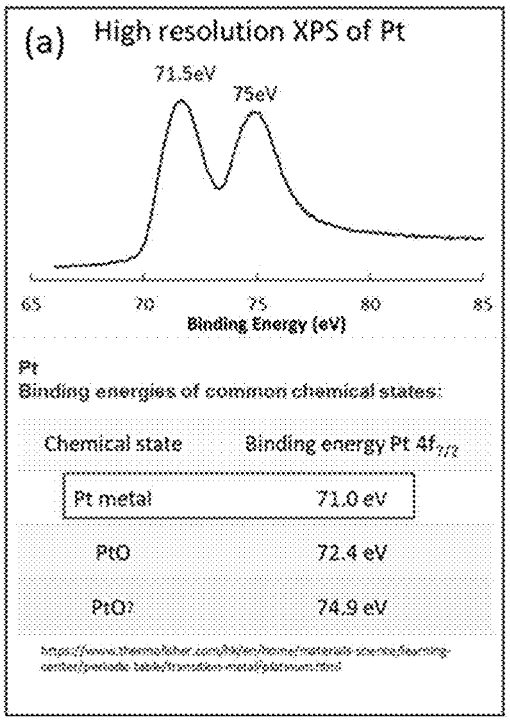
FIG. 3A is a high-resolution Pt XPS scan indicating the metallic state of Pt deposited on a graphite fiber and FIG. 3B is a scanning electron microscope-energy-dispersive spectroscopy (SEM-EDS) scan of C, O, Cl and Pt on a laser treated graphite fiber which indicates the Pt metal deposition in micro size.
Figure 3B:
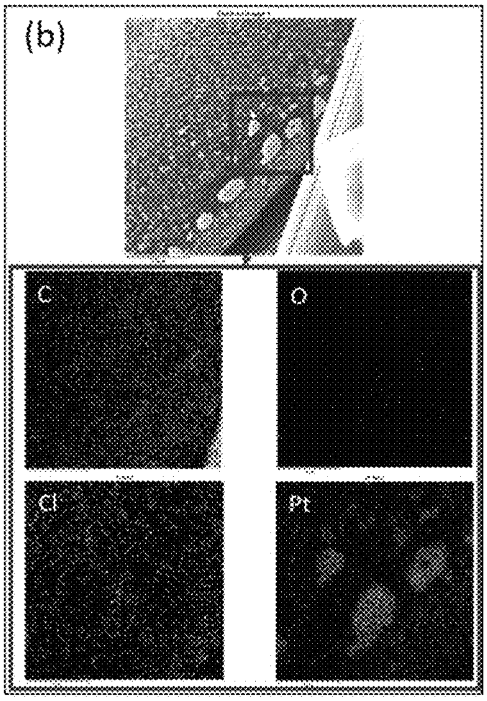

A first example was created by preparing a 50 mM $H_2PtCl_6$ solution and sprayed it onto a piece of carbon cloth. After spraying, the carbon cloth was left to dry in air overnight. Then the dried carbon cloth was laser treated with a linear heat density of 0.17 J/mm to reduce $Pt^{4+}$ into Pt. The XPS scan result (FIG. 3A) shows the successful reduction of $Pt^{4+}$ to Pt, while the SEM-EDS scan result (FIG. 3B) shows the Pt deposited on the carbon fibre in 1-2 μm size.

Figure 4:
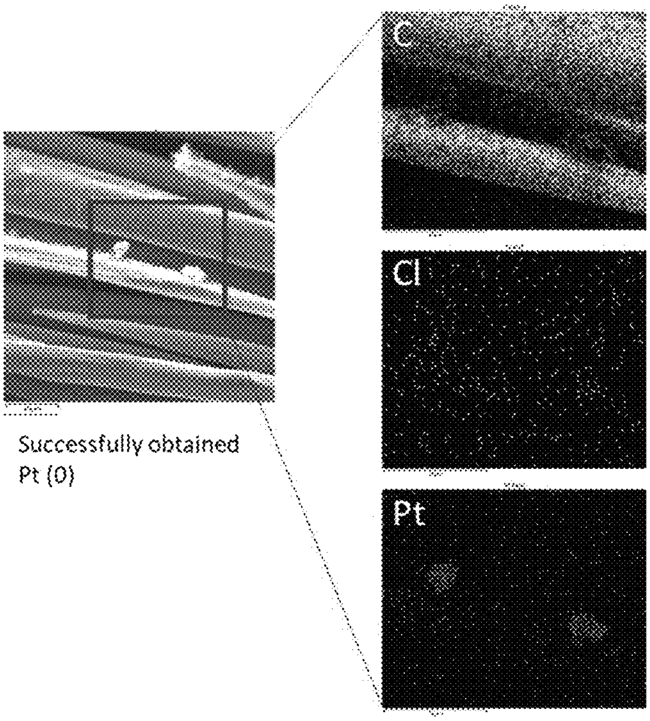
FIG. 4 is an SEM-EDS scan of C, O, Cl and Pt on a laser treated graphite fiber, which indicates the Pt metal deposition in micro size.

A second example was created by preparing a 50 mM $PtCl_4$ solution and sprayed it onto a piece of carbon cloth. Immediately after the spraying, the carbon cloth was transferred into a vacuum oven and dried for 4 hours at 60° C. Then the dried carbon cloth was laser treated with a linear heat density of 0.17 J/mm to reduce $Pt^{4+}$ into Pt. The XPS result (FIG. 4) shows the successful reduction of $Pt^{4+}$ to Pt and the SEM result shows the Pt deposited on the carbon fibre in 1-2 μm size.

The mentioned carbon paper with the loaded Pt can then be directly used as an electrode in a fuel cell or a membrane in a catalytic converter of an automobile.

In general, the present invention involves in-situ inducement of the growth of Pt or other metallic particles on carbon paper, which can later be assembled directly into an electrode for further use or testing. The laser process of the present invention allows for direct deposition of Pt catalyst on the electrode without the adoption of the whole slurry preparation, tape casting and drying procedure of the prior art.

While the invention is explained in relation to certain embodiments, it is to be understood that various modifications thereof will become apparent to those skilled in the art upon reading the specification. Therefore, it is to be understood that the invention disclosed herein is intended to cover such modifications.

The invention claimed is:

1. A method of forming a platinum on carbon (Pt/C) catalyst, comprising the steps of:
- impregnating a carbon substrate made of carbon materials with a Pt ion containing solution;
- drying the impregnated substrate; and
- scribing the surface of the substrate with a laser beam by moving the beam over the surface in order to vaporize the carbon materials and redeposited them as nano sized carbon particles onto the carbon substrate, wherein a laser forming the laser beam has its power, sweeping frequency and pulsation adjusted to obtain different Pt oxidation states and particle morphology;
- whereby the heat generated in situ from the laser process reduces Pt salt particles dispersed on the surface into Pt (0).

2. The method of forming platinum on carbon (Pt/C) catalyst according to claim 1 wherein the carbon substrate is carbon paper.

3. The method of forming platinum on carbon (Pt/C) catalyst according to claim 1 wherein the step of impregnating involves spraying or soaking.

4. The method of forming platinum on carbon (Pt/C) catalyst according to claim 1 wherein the Pt ion containing solution includes 0.1 mM to 100 mM of $PtCl_4$, $H_2PtCl_6$, or $H_2Pt(OH)_6$ in deionized water or ethanol or isopropanol.

5. The method of forming platinum on carbon (Pt/C) catalyst according to claim 1 wherein the drying step is carried out in an oven which could be under vacuum, $N_2$ or Ar or other inert gas protection.

6. The method of forming platinum on carbon (Pt/C) catalyst according to claim 1 wherein the laser beam has a wavelength of 300-700 nm.

7. The method of forming platinum on carbon (Pt/C) catalyst according to claim 6 wherein the laser beam has a wavelength of 455 nm.

8. A carbon substrate with loaded Pt made according to the method of claim 1.

9. The carbon substrate of claim 8 used directly as an electrode of a fuel cell.

10. The carbon substrate of claim 8 used directly as a membrane in a catalytic converter of an automobile.

11. A method of forming a platinum on carbon (Pt/C) catalyst, comprising the steps of:
- preparing a 50 mM $H_2PtCl_6$ solution;
- spraying the prepared solution onto a piece of carbon cloth;
- after spraying, leaving the carbon cloth to dry in air overnight; and
- laser treating the dried carbon cloth by sweeping a laser beam having a linear heat density of 0.17 J/mm over the cloth to reduce $Pt^{4+}$ into Pt, wherein a laser forming the laser beam has its power, sweeping frequency and pulsation adjusted to obtain different Pt oxidation states and particle morphology.

12. A method of forming a platinum on carbon (Pt/C) catalyst, comprising the steps of:

preparing a 50 mM $PtCl_4$ solution;

sprayed the solution onto a piece of carbon cloth;

immediately after spraying, transferring the carbon cloth into a vacuum oven;

drying the cloth in the oven for about 4 hours at about 60° C.; and laser treating the dried carbon cloth with by sweeping a laser beam having a linear heat density of 0.17 J/mm over the cloth to reduce $Pt^{4+}$ into Pt, wherein a laser forming the laser beam has its power, sweeping frequency and pulsation adjusted to obtain different Pt oxidation states and particle morphology.

13. The method of forming platinum on carbon (Pt/C) catalyst according to claim 1 wherein the heating is to less than 510° C.

14. The method of forming platinum on carbon (Pt/C) catalyst according to claim 11 wherein the heating is to less than 510° C.

15. The method of forming platinum on carbon (Pt/C) catalyst according to claim 12 wherein the heating is to less than 510° C.

* * * * *